June 24, 1969 — M. H. K. AARNAES — 3,451,646
AIRCRAFT WING PIVOT
Filed Nov. 25, 1966
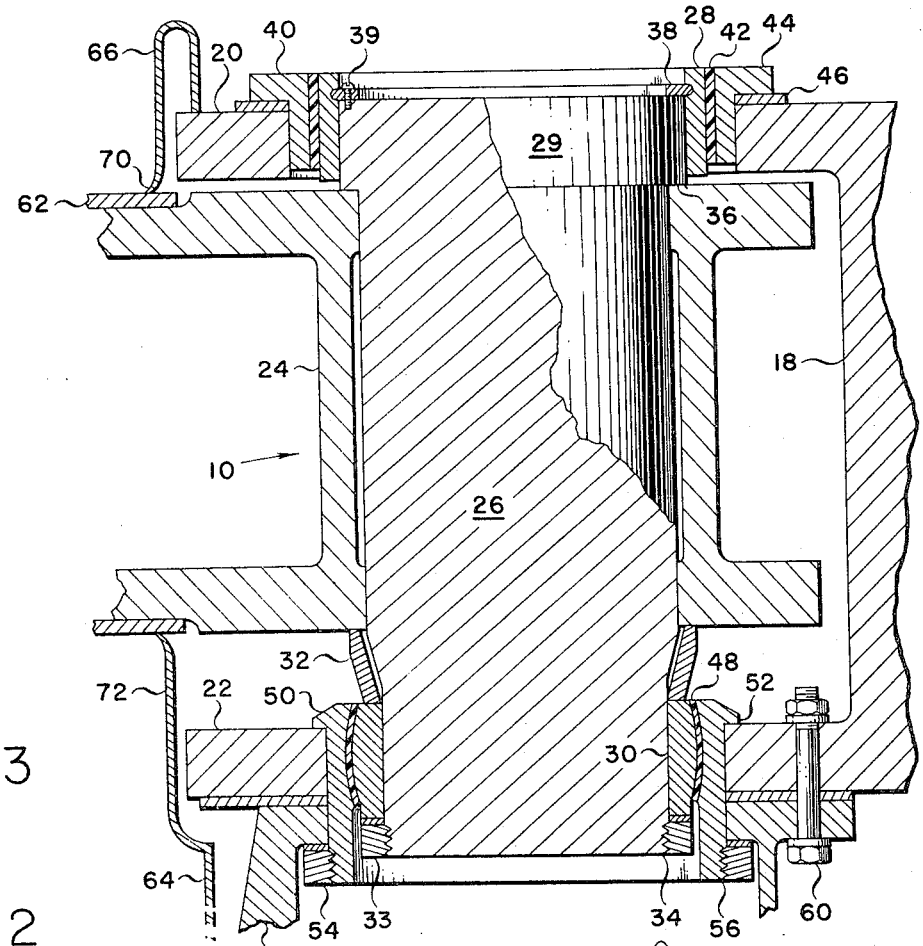
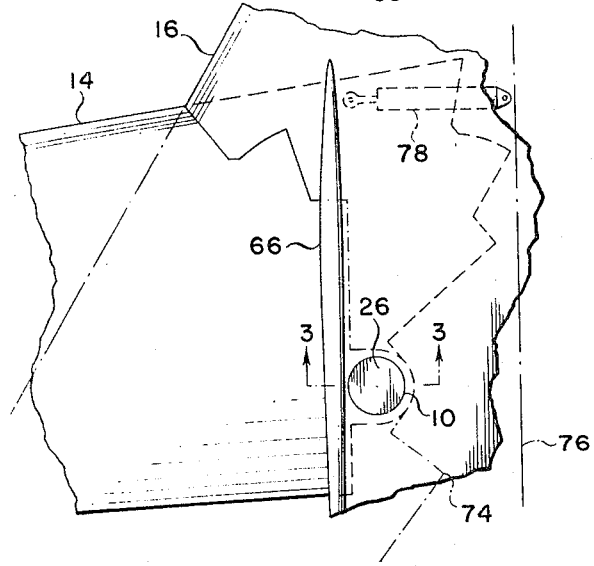
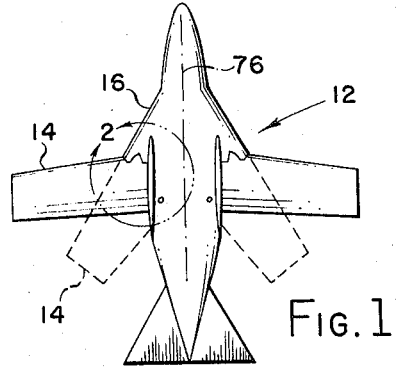
INVENTOR.
MORTEN H. K. AARNAES
BY George A. Sullivan
Agent United States Patent Office 3,451,646
Patented June 24, 1969

3,451,646
AIRCRAFT WING PIVOT
Morten H. K. Aarnaes, Sherman Oaks, Calif., assignor to Lockheed Aircraft Corporation, Burbank, Calif.
Filed Nov. 25, 1966, Ser. No. 596,915
Int. Cl. B64c *3/38, 33/02*
U.S. Cl. 244—46                        4 Claims

ABSTRACT OF THE DISCLOSURE

A wing pivot arrangement for pivotally connecting an aircraft wing to a main body structure. The pivot includes a pin engaging the wing and the main body structure such that any axial loads on the pin from bending and shear are transferred directly into the main body structure.

BACKGROUND OF THE INVENTION

*Field of invention*

This invention relates to an aircraft wing pivot, and more particularly to an inboard, vertical pin wing pivot arrangement which is supported by the main aircraft structure and which includes a self-aligning spherical bearing providing a combined load path to the aircraft structure for vertical shear loads and bending loads.

*Description of the prior art*

In aircraft it is sometimes necessary to provide a variable sweep angle in each wing at a specified point. A number of prior art wing pivot arrangements are available to accomplish this result. These arrangements include a track-and-shoe pivot design, an outboard vertical pin design, an outboard double vertical pin design, and an anti-friction bearing pivot design. While generally satisfactory, these designs do have certain disadvantages.

One disadvantage with the anti-friction bearing design resides in the fact that large radii are used as supporting surfaces. Such surfaces are not conducive to good aerodynamic flow.

A disadvantage in the track-and shoe design resides in the fact that the design inherently requires a heavy structure. Additionally, binding sometimes occurs during operation, and the transfer of vertical shear loads takes place at an excessive distance from the pivot axis.

Outboard vertical pin designs are also disadvantageous in their requirement that the bearing which carries vertical shear loads is separated from the bearing which transfers bending loads. This results in load paths of extreme length and expensive construction in order to avoid excessive wear in shear-carrying members.

SUMMARY OF THE INVENTION

This invention pertains to a wing pivot arrangement for pivotally connecting a wing to a main body structure. The wing pivot arrangement includes an upper and lower lug affixed to the main body structure, a pin having a spherical bearing journaled in one of the lugs and an aircraft wing having a wing hub journaled on the pin between the upper and lower lugs. The pin thereby transfers any bending and shear loads of the wing directly to the main body structure through the spherical bearing.

In view of the foregoing factors and conditions which are characteristic of wing pivots, it is a primary object of the present invention to provide a new and improved wing pivot not subject to the disadvantages enumerated. Such pivot includes an inboard pin located within the aircraft body adjacent the wing, the pin being constructed and oriented in such a matter that its load path combines vertical shear loads and bending loads in a self-aligning bearing which is supported by the main aircraft structure.

Another object of the present invention is to provide a vertical pin for an aircraft wing joint having a spherical bearing through which axial loads from bending and shear are transferred to the aircraft body structure.

A further object of the present invention is to provide a vertical pivot pin for a wing joint in an aircraft which eliminates the problem of tying an extra shear-carrying bearing member to the pin.

According to the present invention, a single vertical pin is placed in each wing of an aircraft at a point where a variable sweep angle is desired. The pin is located just inside the main body structure which may comprise the fuselage, a wing nacelle or a pod of some type, and is therefore referred to as an inboard pin. The wing structure extends inside the main body and axial loads from bending and shear are transferred directly into the body structure through a single spherical bearing at the bottom of the pin.

BRIEF DESCRIPTION OF THE DRAWINGS

FIGURE 1 is a plan view of an aircraft incorporating an inboard vertical pin wing pivot of the present invention, and showing the wing in the forward and back positions;

FIGURE 2 is a plan view, on an enlarged scale, of the area enclosed within circle 2 of FIGURE 1; and FIGURE 3 is a cross-sectional view taken along line 3—3 of FIGURE 2.

DESCRIPTION OF THE PREFERRED EMBODIMENT

Referring again to the drawings, a wing pivot constituting a presently preferred embodiment of the invention, generally designated 10, is shown for purposes of illustration, but not of limitation, as pivotally connecting each wing 14 to the main body structure or fuselage 16 of an aircraft 12.

The main body structure or fuselage 16 includes a pair of fixed structural members, such as the one shown at 18. Each structural member 18 has an upper lug 20 and a lower lug 22 between which a wing hub 24 of an associated movable wing 14 is mounted. Each wing hub 24 is frictionally engaged by a pin 26 which carries a radial bearing 28 on a collar 29 at its upper end and a spherical bearing 30 at its lower end. A spacer 32 encompasses the pin 26 between the wing hub 24 and the spherical bearing 30 and coacts with a nut 33 which threadedly engages external threads 34 on the lower end of pin 26 to firmly engage spherical bearing 30. This, in turn, brings the spacer 32 into firm engagement with wing hub 24 forcing it into engagement with the underside 36 of collar 29.

Each radial bearing 28 is maintained in position on its collar 29 by a retainer ring 38 and screw means 39 fastening ring 38 to collar 29. Friction between each radial bearing 28 and its associated bearing race 40 is minimized by an annular liner 42 which is made of a material, such as reinforced Teflon, having a low coefficient of friction. The bearing race 40 engages upper lug 20 with a tight, frictional fit and includes an annular flange 44 which rides on an annular spacer 46 on top of lug 20.

The spherical bearing 30 also carries a Teflon liner 48 which minimizes friction between bearing 30 and its outer race 50. The race 50 includes an annular flange 52 which bears against lower lug 22 and which is maintained in engagement therewith by a nut 54. The nut 54 threadedly engages external threads 56 on the lower end of race 50 and bears against a framing member 58. The framing member 58 is rigidly affixed to the structure 18 by suitable means, such as the bolt shown at 60. With this arrangement, the spherical bearing 30 is self-aligning and transfers axial loads from bending and shear directly into the fuselage 16 through the structural member 18. It is also noted that because the diameter of pin 26 incrementally reduces from collar 29 to its lower end, pin 26 can be easily inserted or removed through lugs 20 and 22 and hub 24 which is an important feature in the assembling and disassembling of the unit.

A first, sealed, sliding connection is provided between the skin 62 of each wing 14 and the skin 64 of the main body member or fuselage 16 adjacent lug 20 by an aerodynamic fairing 66. Surface continuity between each wing 14 and fuselage 16 is maintained during pivoting of a wing 14 by fairing members 70 which are connected to fuselage 16 and overlie their associated wings 14. A second, sealed, sliding connection is provided between each wing 14 and fuselage 16 adjacent lower lug 22 by a fairing member 72 which is connected to the skin 64 of fuselage 16.

It is to be noted from FIGURE 2 that the pin 26 is located just inside the main body structure or fuselage 16 and that one edge 74 of wing 14 shown in broken lines extends inside the fuselage 16 to a point near the centerline 76 thereof when the wing 14 is in its swept or back position.

The wing 14 is swung from the extended position shown in solid lines in FIGURES 1 and 2 to the swept position shown in broken lines by an actuator 78 also shown in broken lines has one end rigidly affixed to fuselage 16 and its other end pinned to wing 14.

Although the wing pivot 10 is shown herein as being located inside the fuselage 16, it is to be understood that it may be located inside a wing nacelle, in a pod or the like where a variable sweep angle is desired.

I claim:
1. In combination with an aircraft having a variable sweep wing connected to a main body through an inboard wing pivot, comprising:
   a structural member secured to said main body for transferring loads thereto;
   pin means secured to said wing for movement therewith and having an upper end and a lower end and a common axis of rotation;
   first bearing means coaxially disposed with respect to said axis of rotation comprising a pair of concentric right cylindrical races one of which is disposed within the other and having a lubricating material interposed therebetween, the upper end of said pin means being secured to the inner one of said races for rotation therewith and the outer one of said races being immovably secured to said structural member; and
   second bearing means comprising a bearing element having a convex surface confronting a complementary bearing element having a concave bearing surface, and having a lubricating material interposed therebetween abutting the surfaces of said bearing elements, said second bearing means being coaxially disposed with respect to said common axis of rotation, the lower end of said pin means being secured to one of said bearing elements for rotation therewith, and the other of said bearing elements being fixedly secured to said structural member to provide a load path from said pin means to said main body for both vertical shear loads and bending loads.

2. An inboard wing pivot as defined in claim 1 including an upper lug and a lower lug fixed to said structural member, said first bearing means being journaled in said upper lug and said second bearing means being journaled in said lower lug.

3. An inboard wing pivot as defined in claim 2 including an aircraft wing having a wing hub journaled on said pin means, for rotation therewith, between said upper and lower lugs.

4. An inboard wing pivot as defined in claim 1 wherein said convex surface bearing element is secured to said pin means for rotation therewith and said concave surface bearing element is secured to said structural member.

References Cited
UNITED STATES PATENTS

| | | | |
|---|---|---|---|
| 3,279,721 | 10/1966 | Dethman | 244—46 |
| 3,227,237 | 1/1966 | Moreno et al. | 180—43 |
| 3,279,868 | 10/1966 | Jacob | 305—59 |
| 3,290,897 | 12/1966 | Kuehn | 308—72 X |

FERGUS S. MIDDLETON, *Primary Examiner.*

RICHARD A. DORNON, *Assistant Examiner.*